Oct. 1, 1929. G. SFIRIS Re. 17,450

KEY RING HOLDER

Original Filed July 14, 1928

Inventor
George Sfiris

By Watson E. Coleman
Attorney

BEST AVAILABLE COPY

Reissued Oct. 1, 1929

Re. 17,450

UNITED STATES PATENT OFFICE

GEORGE SFIRIS, OF BEAUMONT, TEXAS

KEY-RING HOLDER

Original No. 1,698,028, dated January 8, 1929, Serial No. 292,746, filed July 14, 1928. Application for reissue filed February 19, 1929. Serial No. 341,155.

This invention relates to key ring holders and has for an important object thereof the provision of means for securing a key ring to a belt in such fashion that it may be readily removed therefrom when its separate use is desired but at the same time may not be withdrawn therefrom by a sudden jerk or pull or may not fall from the holder.

A further object of the invention is to provide a device of this character which may be readily and cheaply manufactured, which will be durable and efficient in service and a general improvement in the art.

These and other objects I attain by the construction shown in the accompanying drawing, wherein for the purpose of illustration is shown a preferred embodiment of my invention and wherein:—

Figure 1:
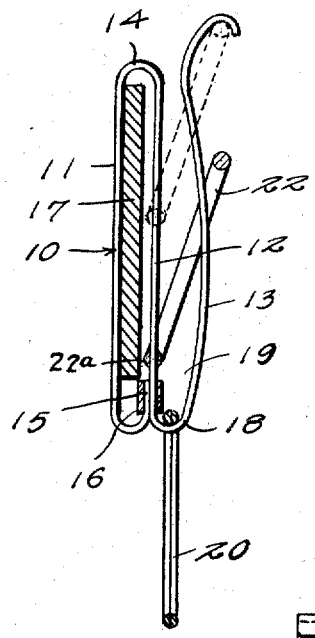
Figure 1 is a sectional view through a key ring holder constructed in accordance with my invention, parts being illustrated in solid lines in the position which they occupy when a light pull is exerted upon the key ring and in dotted lines in the position which they occupy when a heavy pull is exerted thereon.
Figure 2:
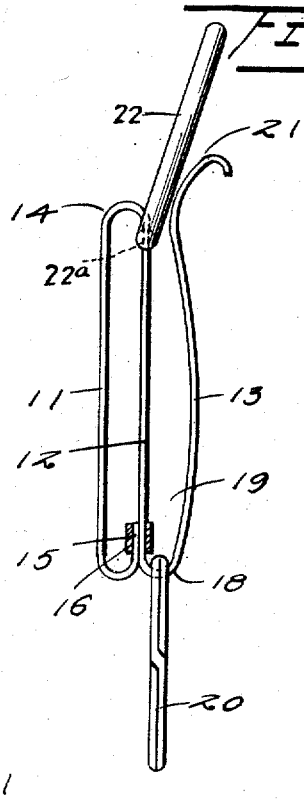
Figure 2 is a side elevation partially in section showing the parts in the position which they occupy when the key ring is to be removed or installed.
Figure 3:
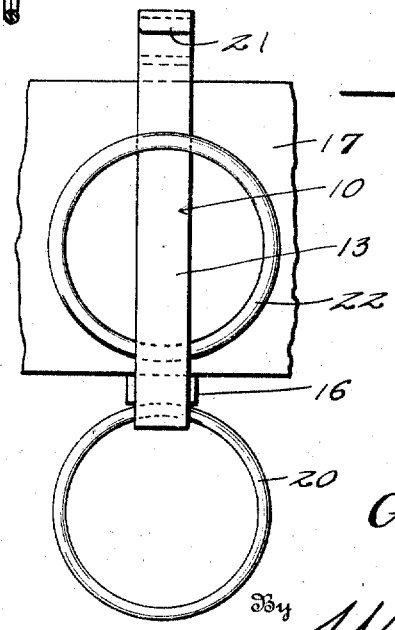
Figure 3 is a front elevation showing the parts in the position which they normally occupy.

Referring now more particularly to the drawing, the numeral 10 generally designates a strip of metal, preferably spring material, which is bent to form three substantially parallel runs 11, 12 and 13. The upper ends of the runs 11 and 12 are connected, as at 14, and the lower end of the run 11 has a hooked terminal 15 contacting the lower end of the run 12 and combining therewith to receive a keeper 16 preventing separation of the lower ends of these runs. The runs 11 and 12, together with their connections, constitute a loop for the reception of a belt 17 and these runs should be spaced apart a distance approximating the thickness of the belt and be of slightly greater length than the width of the belt. The runs 12 and 13 are connected at their lower ends, as indicated at 18, and combine to form a relatively deep hook 19 for the reception of a key ring 20. The upper end of the run 13 has a reverted end portion 21 which is disposed at the outer face thereof or that face remote from the run 12.

In combination with a structure of this character, I employ a ring 22 which is slidably engaged with the outer run 12 of the belt loop.

The ring 22 has an opening 22ª formed therein for the reception of the run 12 and has engagement with this run such that it inclines upwardly and outwardly therefrom and extends in close proximity to the outer face of the run 13, thus bridging the bight of the hook and serving to retain the key ring therein. The opening 22ª is formed in the body of the ring 22 and, as stated, receives the run 12, the main opening of the ring receiving the run 13. The opening 22ª is arranged at an angle with respect to the axis of the ring 22, so as to effect such an engagement or connection between the ring and the run 12, that the ring is supported in the upwardly and outwardly inclined position stated. The inner and outer walls of the opening 22ª contact with the run 12 to maintain the ring 22 in the position stated.

It will be obvious that movement of the key ring upwardly will cause this key ring to engage with the ring 22 and that this ring will serve to check its upward movement under ordinary circumstances.

At this time, upward movement of the key ring will be prevented unless an excessively hard pull is being placed thereagainst. In this event, the ring 22 will be shifted by the ring 20 but at the same time will be wedged against the outer face of the run 13 so that as it reaches the upper end of this run, it will be caught beneath the hooked terminal 21 thereof and its further upward movement positively prevented.

It will be obvious that a device of this character provides a very safe and convenient means for carrying keys and will, at the same time, permit ready removal thereof. All that is necessary to accomplish this removal is to slide the ring 22 upwardly upon the run 12 while forcing the run 13 inwardly until this ring may be swung about the upper end of the run 13. At this time, the mouth of the hook 19 will be opened so that the key ring 20 may be readily removed therefrom.

Since the construction hereinbefore set forth is capable of a certain range of change and modification without materially departing from the spirit of the invention, I do not wish to be limited to such specific structure except as hereinafter claimed.

I claim:—

1. In a key ring holder, a belt receiving loop, a member combining with the front wall of the loop to provide an open-topped hook for the reception of a key ring, and a retaining ring slidably mounted upon the outer wall of the belt receiving loop and surrounding said member, said retaining ring engaging the outer wall of the hook and bridging the bight thereof to prevent escape of the key ring therefrom, said member having means at its upper end normally preventing passage of the retaining ring therefrom.

2. In a key ring holder, a belt receiving loop, a member combining with the front wall of the loop to provide an open-topped hook for the reception of a key ring, and a retaining ring slidably mounted upon the outer wall of the belt receiving loop and surrounding said member, said retaining ring engaging the outer wall of the hook and bridging the bight thereof to prevent escape of the key ring therefrom, the upper end of said member having a downwardly facing hook.

3. In a key ring holder, a belt receiving loop, a member combining with the front wall of the loop to provide an open-topped hook for the reception of a key ring, and a retaining ring slidably mounted upon the outer wall of the belt receiving loop and surrounding said member, said retaining ring engaging the outer wall of the hook and bridging the bight thereof to prevent escape of the key ring therefrom, the upper end of said member having a downwardly facing hook, said member being flexible to permit passage of said ring over the upper end thereof and thereby permit removal of the key ring from the first named hook.

4. In a key ring holder, a belt receiving loop, a member combining with the front wall of the loop to provide an open-topped hook for the reception of a key ring, a retaining ring slidably mounted upon the outer wall of the belt receiving loop and surrounding said member, said retaining ring engaging the outer wall of the hook and bridging the bight thereof to prevent escape of the key ring therefrom, and means upon the member at the upper end thereof normally positioned to engage said ring upon upward movement thereof to limit such upward movement.

5. In a key ring holder, a belt receiving loop, a member combining with the front wall of the loop to provide an open-topped hook for the reception of a key ring, a retaining ring slidably mounted upon the outer wall of the belt receiving loop and surrounding said member, said retaining ring engaging the outer wall of the hook and bridging the bight thereof to prevent escape of the key ring therefrom, and means upon the member at the upper end thereof normally positioned to engage said ring upon upward movement thereof to limit such upward movement, the member being flexible to permit shifting of the ring thereover to thereby open the key ring receiving hook and permitting application or removal of the key ring.

In testimony whereof I hereunto affix my signature.

GEORGE SFIRIS.